J. KROHN.
MECHANICAL MOVEMENT.
APPLICATION FILED APR. 26, 1920.
1,392,508.
Patented Oct. 4, 1921.
2 SHEETS—SHEET 2.
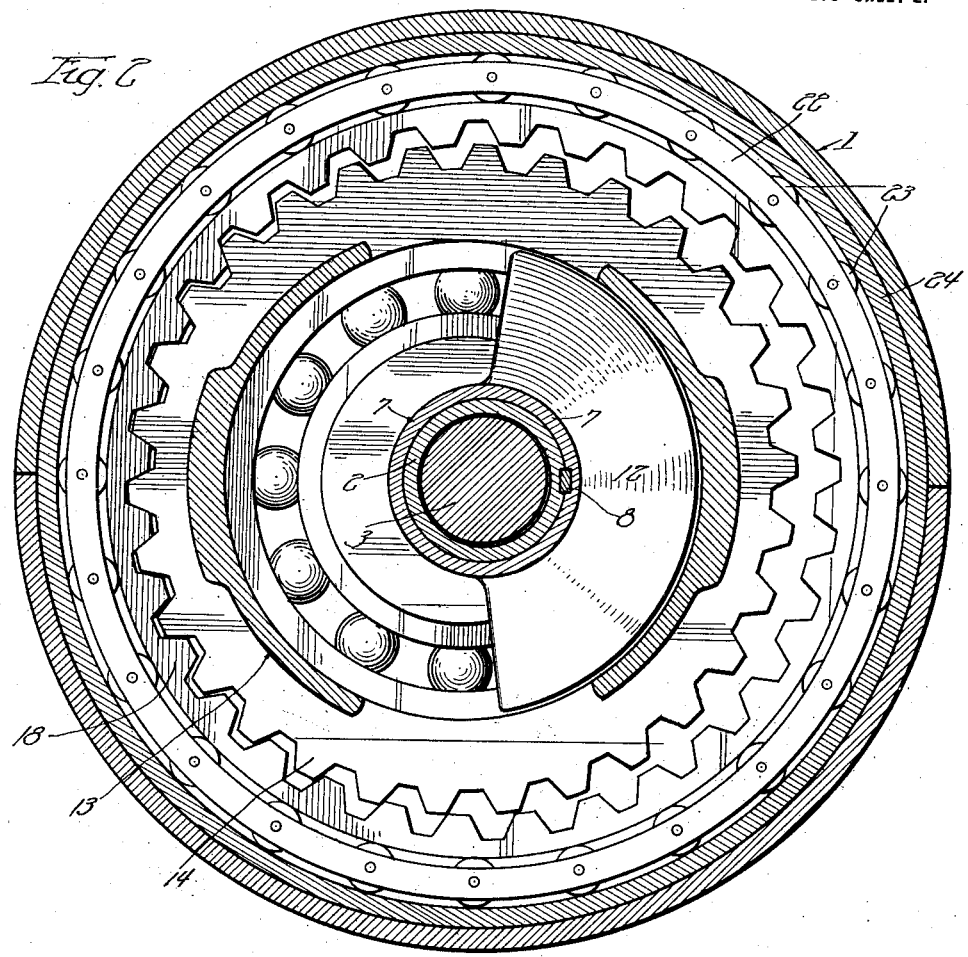
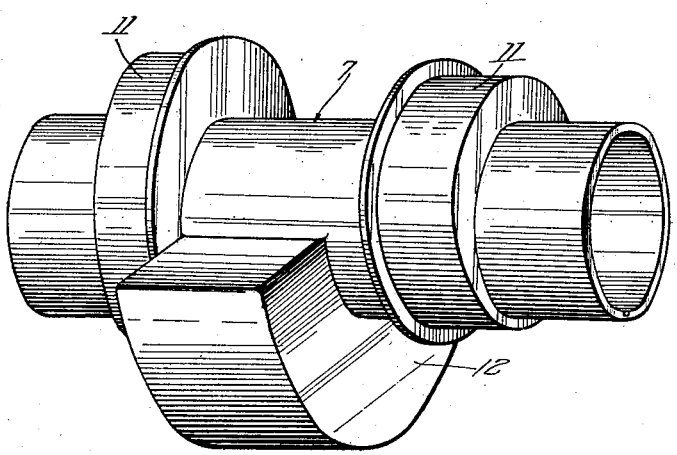
Inventor
John Krohn

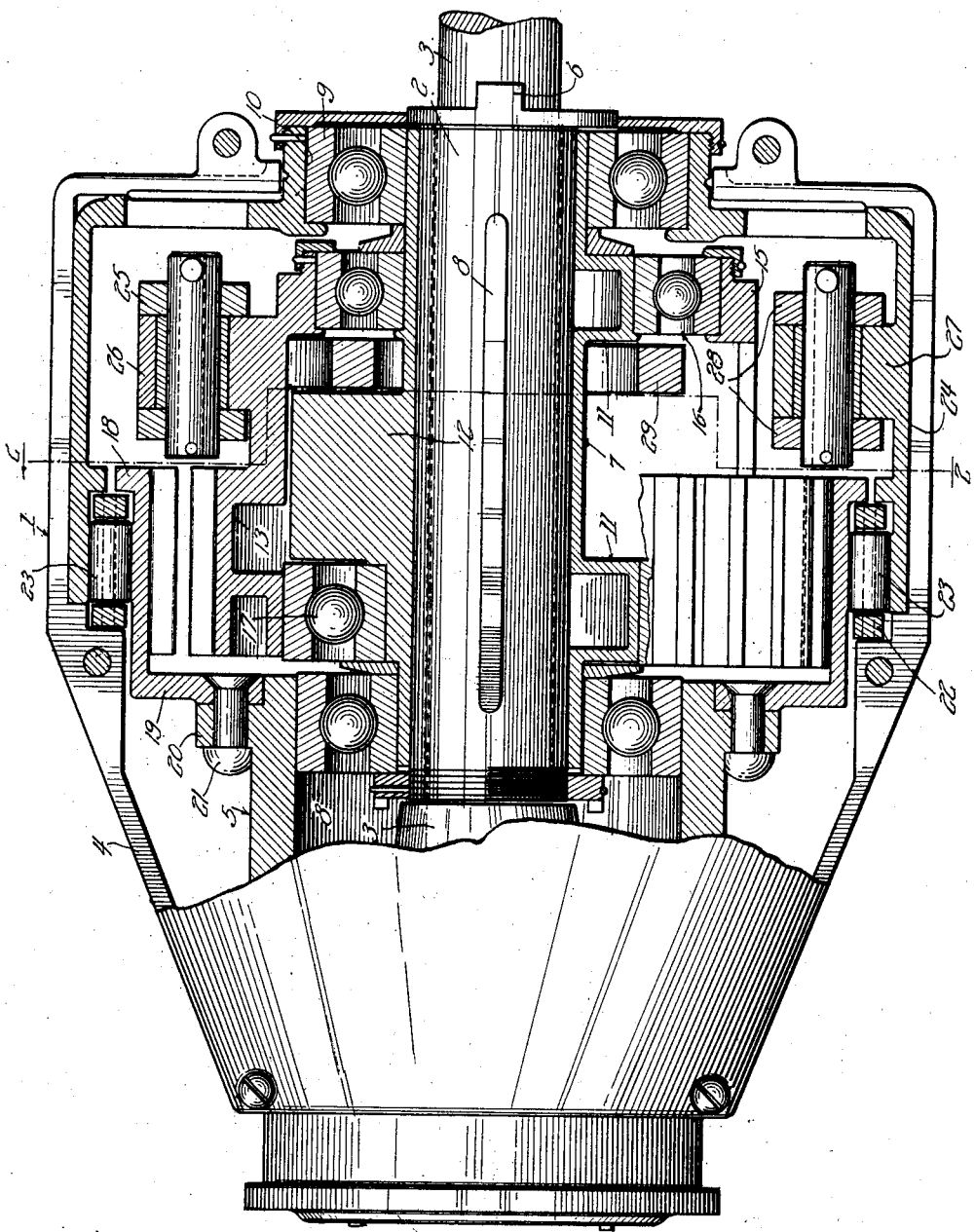

UNITED STATES PATENT OFFICE.

JOHN KROHN, OF NEWARK, NEW JERSEY.

MECHANICAL MOVEMENT.

1,392,508.

Specification of Letters Patent. Patented Oct. 4, 1921.

Application filed April 26, 1920. Serial No. 376,553.

*To all whom it may concern:*

Be it known that I, JOHN KROHN, a citizen of the United States, and a resident of Newark, in the county of Essex and State of New Jersey, have invented certain new and useful Improvements in Mechanical Movements, of which the following is a specification.

This invention relates to improvements in mechanical movements, and more particularly to combination of mechanical elements incorporated in the driving mechanism of motor vehicles, and especially in the speed reducing gearing thereof. The mechanical movement embodying the invention is herein illustrated and described as forming a part of that type of speed reducing mechanism comprising in general a driving shaft, on which is mounted an eccentrically gyrating gear wheel which meshes with an internal gear wheel carried by the driven shaft, the so-called eccentric gear wheel being of a smaller pitch diameter and of a less number of teeth than the internal gear wheel, so that as the driving shaft is rotated, power is transmitted to the driven shaft in the form of a rotative movement at a reduced speed in the inverse ratio of the number of teeth of the gear wheels.

This invention pertains to the mechanism associated with the eccentrically rotating gear wheel, and has for its purpose the counter-balancing of this member in order to overcome the unequal distribution of the weight of the rotating parts with respect to the common axis of rotation, and to thereby eliminate excessive wear, vibration or other undesired results that may develop, particularly where the parts are rotated at a high speed.

The transmission mechanism herein described and illustrated is more especially designed as a part of the driving mechanism of an electric driven vehicle, although it is to be understood that the same may be applied in any mechanism adapted for transmitting power and involving the reduction of speed. The mechanism hereinafter described has reference to the accompanying drawings, in which—

Figure 1 is a view in longitudinal section of the casing inclosing the driving and driven shafts, the differential mechanism associated therewith, and the speed reducing gearing embodying the mechanical movement of the invention;

Fig. 2 is a cross sectional view taken on line 2—2 of Fig. 1, and

Fig. 3 is a perspective view of the rotative sleeve provided with the eccentric bearing surfaces and the counter-weight.

Referring in general to the mechanism and the parts associated with the mechanical movement involved, a casing 1, generally cylindric in shape, is supported upon a suitable supporting member, as for instance, the rear axle of the vehicle, said casing being arranged concentrically with respect to the driving shaft 2, which may be also termed the driving member, and the driven shafts 3—3, which may also be termed the driven members, said driving and driven shafts rotating about coincident axes, and terminating within the casing 1. Interposed between the driving shaft 2 and the driven shafts 3—3 is the usual form of differential gearing, the same being located at the left hand end of the casing 1, as shown in Fig. 1, and inclosed within that portion thereof, surrounded by the tapered wall portion 4. This differential mechanism serves the usual purpose of compensating for the increased speed of rotation of either driven shaft (which are directly connected to the driving wheels) in the travel of the vehicle in a curvilinear path.

The differential mechanism comprises the usual arrangement of beveled gears mounted upon the driven shafts 3—3, the beveled pinions connecting these beveled gears, and carried by the rotative sleeve 5, journaled within the casing by means of suitable anti-friction bearings. In other words, the differential mechanism is interposed between the driven shafts 3—3 and the rotative sleeve 5, which latter member is in driving engagement with the driving shaft 2 through the eccentric gear drive hereinafter to be described in detail.

The driving shaft or member 2 consists of a tubular member surrounding the driven shaft 3 extending from the right hand end of the casing, and is positively connected or coupled with the motor or other source of power through the medium of a coupling member 6 mounted at its outer end. Surrounding the shaft 2 is a tubular sleeve 7 extending throughout the length of the driving shaft, and permanently keyed thereto by means of a key 8. The driving shaft and the sleeve 7 are journaled in ball bearings 8 and 9 which engage the extreme end portions of the sleeve 7, the inner bearing 8 being carried also by the rotative sleeve 5 and the outer bearing 9 being mounted in a radial groove 10 surrounding the outer end of the driving shaft 2. Immediately inward from the ends of the sleeve 7 are formed integral and eccentrically disposed bearing members 11—11, the same being spaced apart from each other by a space forming the central portion of the sleeve 7. These eccentric bearing members, as before suggested, are formed integral with the sleeves, and provide annular bearing surfaces having their centers offset from the axis of rotation of the shaft 2, and its sleeve 7. The eccentric bearing members 11—11 are identical as regards their annular relation to the sleeve 7. Intermediate the eccentric bearing members 11—11 and extending radially throughout substantially one-half of the circumference of the sleeve 7, is a counter-weight 12, preferably formed or cast integrally with said sleeve 7. This counter-weight is preferably a mass of metal of predetermined weight, as will hereinafter appear, and having a semi-circular shape, and distributed throughout that portion of the shaft opposed to the portions of maximum offset or eccentricity of said bearing members 11—11.

Mounted upon the sleeve 2 and directly upon the eccentric bearing members 11—11 thereof, is a gear member 13, the same comprising a toothed body portion 14, and an integral ring 15 offset laterally from the body member 14, and lying in the plane of the right hand eccentric bearing member 11. Interposed between the ring 15 and the adjacent eccentric bearing member 11 is a ball bearing 16 of the ordinary construction. The body portion or gear wheel proper 14 is more directly supported by means of a similar ball bearing 17 interposed between the internal annular surface of the gear wheel and the other or innermost eccentric bearing member 11. Immediately surrounding the gear wheel 14 is an internal gear wheel 18, the same being slightly greater in diameter than the gear wheel 14, and having say, one more tooth than has said gear wheel 14. The gear wheel 18 is rigidly mounted upon the rotative sleeve 5 through the medium of a radial flange 19 integral with the gear wheel 18, and which has abutting relation with a radial flange 20 formed at the inner end of said rotative sleeve 5, and a plurality of rivets or other fastening members 21 extending through said flanges. A large encircling roller bearing 22 surrounds the gear wheel 18 and serves to anti-frictionally mount the same within the casing, the rollers 23 thereof engaging the outer annular surface of the gear wheel 18, and the inner annular surface of the sleeve 24 which forms a lining for the casing throughout the portion thereof surrounding the gear wheels and parts associated therewith.

The eccentric or gyrating gear wheel 13 comprises other parts designed to support the same in its movement, as follows:

Intermediate the gear wheel proper and the ring 15 thereof are pivotally connected links 25 through the medium of radial lug 26; and diametrically opposed to said links and pivotally connected to a lug 27 formed integral with the sleeve 24 are links 28. The free ends of these links are joined together by means of a transverse plate 29. The details of construction of these links and connecting plate are fully illustrated and described in my copending application hereinbefore mentioned, and therefore it is not thought necessary to describe this mechanism in detail other than to state that by means of this arrangement of links the eccentrically rotative gear member 13 is supported in its motion, as will be understood from the following description of the movements of the several parts of the mechanism described.

Assuming that the driving shaft is positively rotated by means of a motor or other prime mover, it is manifest that the sleeve 7 will rotate with the driving shaft at the same speed. The eccentric gear member 13 being journaled or rotatively mounted upon the eccentric bearing members 11, 11 integral with the sleeve 7, an eccentric gyratory movement is imparted to said gear member 13, this movement being more in the nature of a rolling movement in contact with and around the internal gear wheel 18, the latter being rotated in the same direction as the driving shaft 2, but at a reduced speed which may be expressed as inversely proportional to the number of teeth of the gear wheels 14 and 18. The rotative movement imparted to the gear-wheel 18 is manifestly transmitted to the rotative sleeve 5, and thence to the driven shafts 3—3 through the intermediate differential gearing. The principle of this type of speed reducing gearing is fully described and illustrated in a prior application filed by me for vehicle drive mechanism on the 22nd day of March, 1917, and bearing Serial No. 156,621, and therefore need not be further described at this time.

Referring now to the function of the counter-weight 12, it is to be observed that this member rotates with the driving shaft 2, its path of rotation being immediately adjacent to the said shaft, and is included within and surrounded by the eccentric gear wheel 14. In other words, the extreme diameter of the annular space swept through by the counter-weight in its rotative movement, is considerably less than the diameter of the eccentric gear wheel 14, in fact, it is substantially of the same diameter as the ball bearings supporting said gear wheel. The counter-weight 12, as before suggested, is so constructed that its center of gravity must necessarily be offset from the axis of rotation of the driving shaft 2. It necessarily follows also that the center of gravity of the eccentric gear member 13 must also be offset from the axis of rotation of the driving shaft. Thus, by designing the counter-weight 12 so that its weight substantially counter-balances the unstable mass of the eccentric gear member 13, and by locating its center of gravity diametrically opposite the true center of gravity of the eccentric gear member, a condition of equilibrium is established which has the effect of overcoming the unstable or unequal distribution of the mass of the rotating parts to the end that all of the parts may rotate at high speed without the attending action that would ordinarily take place in the absence of the counter-balancing element, these effects of unstability being ordinarily vibrations created throughout the mechanism, excessive and unequal wear between the parts, as well as other tendencies which develop in magnitude as the speed is increased. It is manifest therefore that in utilizing the particular type of speed reducing mechanism herein described, in connection with motor vehicle transmission, that its practicability must necessarily depend upon the smooth action between the power transmitting members, this action being highly desirable under condition of high speeds that is ordinarily present in motor vehicle transmissions. This counterbalancing feature has as a further advantage, its location in close proximity to its axis of rotation, and its inclosure within the eccentric gear member with which it cooperates. For this reason it occupies very little space in the mechanism, and its full advantages may be secured without sacrificing any degree of compactness in the complete mechanism of which it forms a part.

The types of mechanism in which this particular arrangement of elements may find its use, may obviously be numerous, and therefore I do not wish to be limited to the particular type of gearing herein illustrated and described, except in so far as it is specifically set forth in the appended claims.

I claim as my invention:

1. In a mechanical movement, the combination of a shaft comprising longitudinally spaced bearing surfaces disposed eccentrically to the axis of rotation of the shaft, a gear wheel rotatively mounted on said eccentric bearing surfaces, and a counterweight fixed to said shaft intermediate said bearing surfaces.

2. In a mechanical movement, the combination of a shaft comprising longitudinally spaced bearing surfaces disposed eccentrically to the axis of said shaft, anti-friction bearings mounted on said bearing surfaces, a gear wheel mounted on said anti-friction bearings, and a counterweight fixed to said shaft intermediate said bearing surfaces.

3. In a mechanical movement, the combination of a shaft, a sleeve fixed to said shaft and comprising radial bearing surfaces spaced apart longitudinally and disposed eccentrically to the axis of said sleeve, a counterweight located therebetween, and a gear wheel mounted on said sleeve and having bearing on said bearing surfaces.

4. In a mechanical movement, the combination of a shaft, a sleeve fixed to said shaft, and comprising longitudinally spaced radial bearing surfaces disposed eccentrically to the axis of rotation of the shaft, a gear wheel rotatively mounted on said eccentric bearing surface, and a counter-weight integral with said sleeve, and located between said bearing surfaces and lying substantially in the same plane with said gear wheel.

5. In a mechanical movement, the combination of driving and driven shafts, a sleeve fixed to said driving shaft and provided with bearing surfaces, a gear wheel rotatively mounted on said sleeve and engaging said eccentric bearing surface, an internal gear wheel concentrically mounted on said driven shaft, and a counter-weight integral with said sleeve and located adjacent to said eccentric bearing surfaces, and having its mass distributed circumferentially about the axis of said sleeve.

In witness whereof, I hereunto subscribe my name this 22nd day of April, A. D., 1920.

JOHN KROHN.